UNITED STATES PATENT OFFICE.

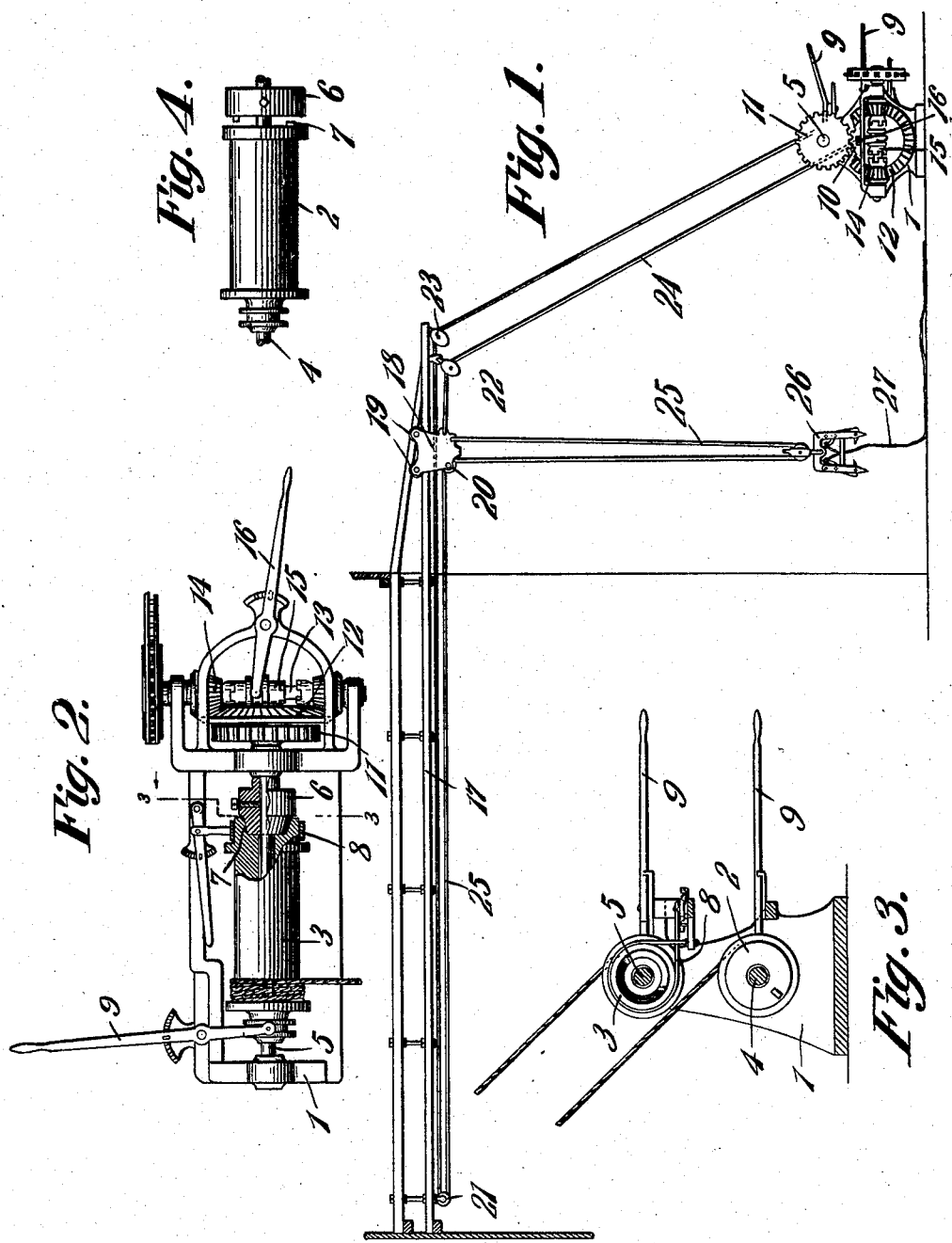

WILLIAM HOPPE, OF FREEPORT, MINNESOTA.

HAY-CARRIER.

No. 867,135.   Specification of Letters Patent.   Patented Sept. 24, 1907.

Application filed July 2, 1906. Serial No. 324,418.

*To all whom it may concern:*

Be it known that I, WILLIAM HOPPE, a citizen of the United States, residing at Freeport, in the county of Stearns and State of Minnesota, have invented a new and useful Hay-Carrier, of which the following is a specification.

This invention has relation to hay carriers and it consists in the novel construction and arrangement of its parts as hereinafter shown and described.

The object of the invention is to provide a carrier adapted to travel upon an elevated track in a barn or hay shed.

A winch is located at any convenient point and a tackle is provided which winds about the drums of the winch and is connected with the carrier. A hay fork of any approved construction is located upon the tackle. The arrangement of the tackle is such and the winch is so constructed that one man may operate the same to cause the carrier to travel in or out of the barn at will, the hay fork to ascend or descend at any desired point and by a connecting cord the single operator standing at the winch may operate the fork to drop the load.

In the accompanying drawing: Figure 1 is a side elevation of the hay carrier. Fig. 2 is a top plan view partly in section of the winch. Fig. 3 is a transverse sectional view of the winch cut on the line 3, 3 of Fig. 2. Fig. 4 is a side elevation of a modified form of the winding drum used upon the winch.

The winch consists of the frame 1 which is mounted on a suitable foundation. The drums 2 and 3 are suitably journaled for rotation within the frame 1. The said drums are loosely mounted upon their respective shafts 4 and 5. The clutch members 6, 6 are fixed to the said shafts 4 and 5 and the clutch members 7, 7 are attached to the ends of the drums 2 and 3 and are located directly opposite the ends of the clutch members 6, 6. The band brake 8 is of usual construction and the band surrounds the end of the drum 3. The levers 9, 9 are suitably fulcrumed to the frame 1 and engage the ends of the drums 2 and 3 opposite the ends thereof to which the said clutch member 7 is attached. By manipulating the levers 9, 9, the drums 2 and 3 may be moved slightly longitudinally and the clutch member 7 moved into frictional contact with the members 6 and thereby cause the said drums 2 and 3 to rotate with their respective shafts 4 and 5.

The gear wheels 10 and 11 are attached to the ends of the shafts 4 and 5 respectively and intermesh with each other. The bevel gear 12 is attached to the shaft 4. The countershaft 13 is suitably journaled in the frame 1 and the bevel pinions 14, 14 are loosely mounted upon the said countershaft 13. The clutch 15 is slidably located upon the countershaft 13 between the bevel pinions 14 and 14. The operating lever 16 is suitably fulcrumed and connected to said clutch 15 and may be moved in order to engage the said clutch with either one of the bevel pinions 14, 14 or to move the said clutch to such a point upon the shaft 13 where it will be out of engagement with both of the said pinions.

From the foregoing description, it is obvious that by rotating the shaft 13 (which may be done by any suitable power, not shown) and by the manipulation of the clutch 15 and through the connections, the drums 2 and 3 may be caused to rotate in either direction or one drum may rotate while the other is at rest. When the drums are rotating, however, they are moving in opposite directions with relation to each other. The track 17 is located in the top of the barn or other structure. The carrier 18 is provided with the wheels 19 which run upon the said track 17. The pulley 20 is journaled in the lower portion of the said carrier 18. The block 21 is located in the barn or structure near the end of the track 17. The blocks 22 and 23 are attached to the said track 17 near the outer end thereof. The tackle 24 is attached at one end to the carrier 18 and passes over the pulley of block 22 and winds around the drum 2. The tackle 25 is attached at one end to the carrier 18 and is provided with the hay fork 26. The said tackle passes over the pulley 20 around the pulley of the block 21 over the pulley of the block 22 and around the drum 3. The rope 27 is attached at one end to the movable members of the hay fork 26 and the other end of said rope is suitably secured in the vicinity of the winch.

From the foregoing description it is obvious that the tackle 25 may be let out so that the fork 26 will descend. The said fork may then be loaded with hay. The tackle 25 is then wound upon the drum 3 and the loaded fork 26 is elevated. When sufficiently elevated, the carrier 18 will be drawn along the track 17 into the barn. When at the proper position, the rope 27 is pulled and the hay is released from the fork 26. By then drawing in the tackle 24 and winding the same about the drum 3, the carrier 18 is pulled to the outer end of the track 17. As the tackle 24 is wound upon the drum 3, the tackle 25 is payed out and vice versa.

Having described my invention, what I claim as new and desire to secure by Letters Patent is:—

A hay carrier comprising an elevated track, a single block depending from one end of the track, two blocks depending from the other end of the track, a carrier mounted upon the track, a pulley journaled upon the carrier and being located below the track, a combined elevating and towing tackle fixed at one end to the carrier, a hay fork located upon said tackle, said tackle passing over the pulley of the carrier through the single block at one end of the track and through one of the blocks at the opposite end of the track, a shaft journaled for rotation, a conical friction clutch member fixed to said shaft, a drum loosely mounted upon said shaft and having at its end a conical friction clutch member adjacent the first said clutch member, means for moving said drum longitudinally, a friction brake for controlling the rotation of the drum, said tackle winding upon said drum; a second tackle for towing only, separated from the first said tackle and attached at its end to the carrier and passing through the remaining block upon the track, a second shaft journaled for rotation, meshing gear wheels attached to the said first and second shafts, means for rotating the said shafts, an interlocking clutch member fixed to said second shaft, a drum loosely mounted upon said second shaft and having at its end an interlocking clutch member adjacent the said fixed interlocking clutch member, means for moving the last said drum longitudinally, the last said tackle winding upon the last said drum, the first said drum, only being provided with friction means for controlling rotation.

In testimony that I claim the foregoing as my own, I have hereto affixed my signature in the presence of two witnesses.

WILLIAM HOPPE.

Witnesses:
JOHN MAYERS,
H. C. UHLENKOTT.